(12) United States Patent
Roshtkhari et al.

(10) Patent No.: US 9,824,281 B2
(45) Date of Patent: Nov. 21, 2017

(54) SYSTEM AND METHOD FOR TRACKING MOVING OBJECTS IN VIDEOS

(71) Applicant: Sportlogiq Inc., Montreal (CA)

(72) Inventors: Mehrsan Javan Roshtkhari, Montreal (CA); Martin D. Levine, Montreal (CA)

(73) Assignee: Sportlogiq Inc., Montreal (CA)

( * ) Notice: Subject to any disclaimer, the term of this patent is extended or adjusted under 35 U.S.C. 154(b) by 105 days.

(21) Appl. No.: 14/713,452

(22) Filed: May 15, 2015

(65) Prior Publication Data

US 2016/0335502 A1    Nov. 17, 2016

(51) Int. Cl.
*G06K 9/00* (2006.01)
(52) U.S. Cl.
CPC .................. *G06K 9/00771* (2013.01)
(58) Field of Classification Search
CPC ......... G06T 2207/10016; G06T 7/2033; G06T 7/20; G06T 7/2006; G06T 2207/30232; G06T 2207/20021; G06T 2207/30241; G06T 2207/10024; G06T 2207/10021; G06T 2207/30196; G06T 7/2053; G06T 7/2093; G06T 7/408; G06K 9/00771; G06K 2009/3291; G06K 9/00711; G06K 9/00624; G06K 9/32; G06K 9/52; G06K 9/4604; G06K 9/00127; G06K 9/00221; G06K 9/00805; G06K 9/2054; G06K 9/00362; G06K 9/00523; G06K 9/00744; G06K 9/00778; H04N 21/4728; H04N 19/167; H04N 19/51; H04N 5/144
See application file for complete search history.

(56) References Cited

U.S. PATENT DOCUMENTS

| 8,391,548 | B1 | 3/2013 | Medioni et al. |
| 8,538,083 | B1 | 9/2013 | Medioni et al. |
| 8,705,793 | B2 | 4/2014 | Nevatia et al. |
| 2008/0123900 | A1* | 5/2008 | Ma .......................... G06K 9/32 382/103 |

(Continued)

FOREIGN PATENT DOCUMENTS

WO    2013072401 A2    5/2013

OTHER PUBLICATIONS

Kratz, L. et al.; "Tracking Pedestrians Using Local Spatio-Temporal Motion Patterns in Extremely Crowded Scenes"; IEEE Transactions on Pattern Analysis and Machine Intelligence; 2012; pp. 987 to 1002; 34(5).

(Continued)

*Primary Examiner* — Amara Abdi
(74) *Attorney, Agent, or Firm* — Brett J. Slaney; Blake, Cassels & Graydon LLP

(57) ABSTRACT

A system and method are provided for tracking objects in a scene from a sequence of images captured by an imaging device. The method includes processing the sequence of images to generate sequential images at a plurality of hierarchical levels to generate a set of regions of interest; and, at each of the hierarchical levels: examining pairs of sequential images to link pixels into short tracklets; and grouping short tracklets that indicate similar motion patterns to generate representative tracklets. The representative tracklets are grouped to generate a tracking result for at least one object.

19 Claims, 8 Drawing Sheets

(56) References Cited

U.S. PATENT DOCUMENTS

| | | | |
|---|---|---|---|
| 2010/0231593 A1* | 9/2010 | Zhou | G06T 3/4007 345/428 |
| 2012/0321137 A1* | 12/2012 | Cheng | G06K 9/00771 382/103 |
| 2013/0142390 A1* | 6/2013 | Othmezouri | G06K 9/00362 382/103 |
| 2014/0016863 A1* | 1/2014 | Saxena | G06F 17/3025 382/165 |
| 2014/0286531 A1 | 9/2014 | Pham | |
| 2014/0347475 A1* | 11/2014 | Divakaran | G06K 9/00771 348/135 |
| 2015/0066448 A1 | 3/2015 | Liu et al. | |

OTHER PUBLICATIONS

Roshtkhari, M. J. et al.; "Multiple Object Tracking Using Local Motion Patterns"; British Machine Vision Conference; 2014; BMVA Press.

Roshan Zamir, A. et al.; "GMCP-Tracker: Global Multi-object Tracking Using Generalized Minimum Clique Graphs"; European Conference on Computer Vision (ECCV 2012); 2012; pp. 343 to 356; Springer Berlin Heidelberg.

Zhang, L. et al.; "Structure Preserving Object Tracking"; IEEE Conference on Computer Vision and Pattern Recognition (CVPR); 2013; pp. 1838 to 1845.

Liu, J., et al.; "Tracking Sports Players with Context-Conditioned Motion Models"; IEEE Conference on Computer Vision and Pattern Recognition (CVPR); 2013; pp. 1830 to 1837.

Huang, C. et al.; "Multiple Target Tracking by Learning-Based Hierarchical Association of Detection Responses"; IEEE Transactions on Pattern Analysis and Machine Intelligence; 2013; pp. 898 to 910; 35(4).

Yang, B. et al.; Multi-Target Tracking by Online Learning a CRF Model of Appearance and Motion Patterns; International Journal of Computer Vision; 2014; p. 203 to 217; 107(2).

Roshtkhari, M.J. et al.; "Online Dominant and Anomalous Behavior Detection in Videos"; IEEE Conference on Computer Vision and Pattern Recognition (CVPR); 2013; pp. 2609 to 2616.

Roshtkhari, M.J. et al.; "An on-line, real-time learning method for detecting anomalies in videos using spatio-temporal compositions"; Computer Vision and Image Understanding; 2013; pp. 1436 to1452; 117(10).

Roshtkhari, M.J. et al.; "Human activity recognition in videos using a single example"; Image and Vision Computing; 2013; pp. 864 to 876; 31(11).

CAVIAR Dataset; http://homepages.inf.ed.ac.uk/rbf/CAVIARDATA1; CAVIAR project/IST 2001 37540; 2003.

Wu, S. et al.; "Chaotic Invariants of Lagrangian Particle Trajectories for Anomaly Detection in Crowded Scenes"; IEEE Conference on Computer Vision and Pattern Recognition (CVPR); 2010; pp. 2054 to 2060.

Brox, T. et al.; "Object Segmentation by Long Term Analysis of Point Trajectories"; European Conference on Computer Vision (ECCV 2010); 2010; pp. 282 to 295; Springer Berlin Heidelberg.

Andriyenko, A. et al.; "Multi-target Tracking by Continuous Energy Minimization"; IEEE Conference on Vision and Pattern Recognition (CVPR); 2011; pp. 1265 to 1272.

Song, B., et al.; "A Stochastic Graph Evolution Framework for Robust Multi-target Tracking"; European Conference on Computer Vision (ECCV 2010); 2010; pp. 605 to 619; Springer Verlag.

Zhang, L. et al.; "Global Data Association for Multi-object Tracking Using Network Flows"; IEEE Conference on Computer Vision and Pattern Recognition (CVPR); 2008; pp. 1 to 8.

Li, Y. et al.; "Learning to Associate: HybridBoosted Multi-Target Tracker for Crowded Scene"; IEEE Conference on Computer Vision and Pattern Recognition (CVPR); 2009; pp. 2953 to 2960.

* cited by examiner

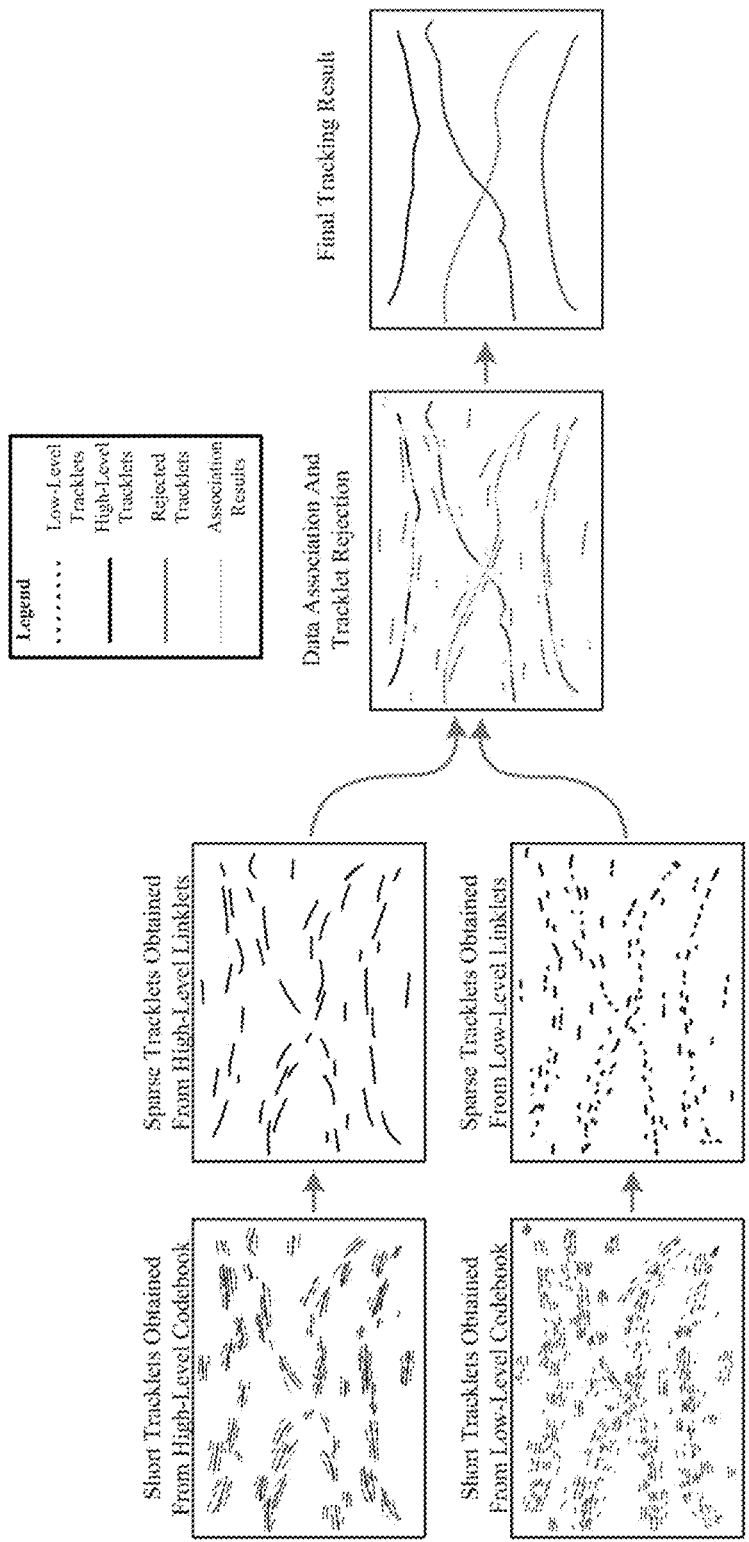

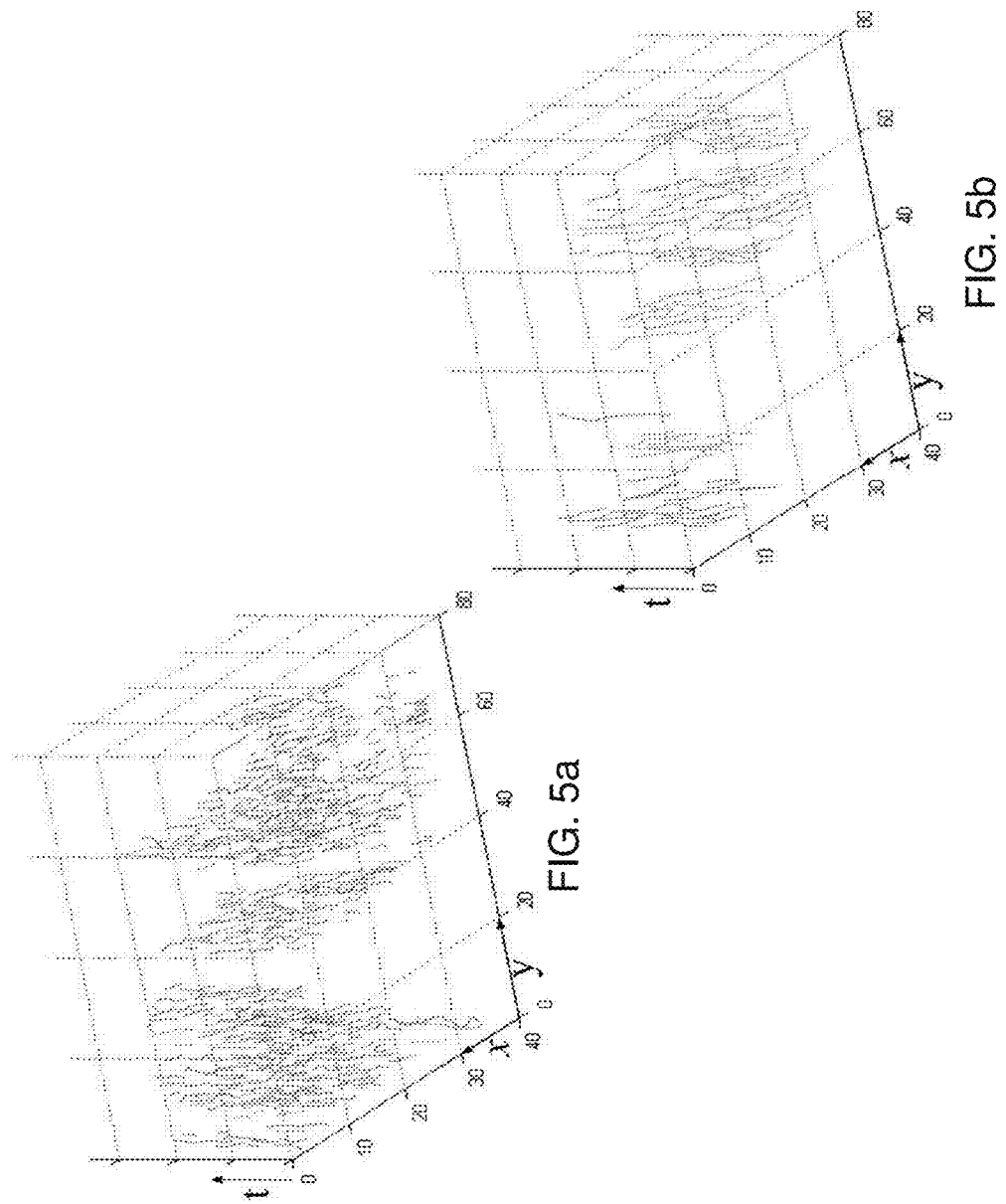

SYSTEM AND METHOD FOR TRACKING MOVING OBJECTS IN VIDEOS

TECHNICAL FIELD

The following relates to systems and methods for tracking moving objects in videos.

DESCRIPTION OF THE RELATED ART

Object tracking is typically considered a fundamental task for any high-level video content analysis system. Decades of research on this topic have produced a diverse set of approaches and a rich collection of tracking algorithms. In the majority of the traditional approaches, only the object itself and/or its background are modeled. However, it has been observed that significant progress has been made in this case. This class of tracking methods can be referred to as "object-centric" approaches [1].

On the other hand, it has been established that detection often cannot be performed when there is no prior knowledge about the specific objects (i.e. targets) being tracked. These methods are referred to as "generic object tracking" or "model-free tracking". Manually annotating sufficient numbers of objects is often prohibitively expensive and impractical. Thus recently approaches for model-free tracking have received increased interest. Model-free tracking is a challenging task because there is little information available about the objects to be tracked (i.e. targets). Another challenge is the presence of an unknown and ever-changing number of objects that could be targets [2].

To date, most of the reported approaches for tracking rely on either robust motion or appearance models of each individual object or on object detection, i.e., they are object-centric. Thus a key assumption is that a reliable object detection algorithm exists, e.g., see references [3, 4] [5] [6] [7]. This remains a challenge, particularly in complex and crowded situations. These methods use the detection response to construct an object trajectory. This is accomplished by using data association based on either the detection responses or a set of short tracks called tracklets that are associated with each detected object. Tracklets are mid-level features that provide more spatial and temporal context than raw sensor data during the process of creating consistent object trajectories.

Subsequently, data association links these tracklets into multi-frame trajectories. The issue of associating tracklets across time, the so-called "data association", is usually formulated as a Maximum A Posteriori (MAP) problem and has been solved using different methods. For example, network flow graphs and cost-flow networks are employed for data association to determine globally optimal solutions for an entire sequence of tracklets. Other data association approaches include the Hungarian algorithm, maximum weight independent sets, the Markov Chain Monte Carlo, and the iterative hierarchical tracklet linking methods.

There are other tracking algorithms, which are based on local spatio-temporal motion patterns in the scene. For example, hidden Markov models are employed to learn local motion patterns that are subsequently used as prior statistics for a particle filter. Alternatively, other methods employ the global motion patterns of a crowd to learn local motion patterns of the neighboring local regions. Individual moving entities are detected by associating similar trajectories based on their features by assuming that objects move in distinct directions, and thus disregard possible and very likely local motion inconsistencies between different body parts. Thus a single pedestrian could be detected as a multiple objects or multiple individuals as the same object. In order to overcome these difficulties.

SUMMARY

In the following, trajectories are analyzed at multiple hierarchical levels, in which the higher levels account for the inconsistency between local motions of a single object.

The following relates to multiple object tracking with visual information, and particularly to tracking without target detection or prior knowledge about targets that are being tracked. This system described herein can also provide the flexibility of adding additional information to a model free multi-object tracking system, including target detectors and entrance/exit regions to improve tracking results.

In an implementation of the system, methods and algorithms are provided for multiple-object tracking in videos either with or without employing target detection systems. The algorithms are directed to creating long-term trajectories for moving objects in the scene by using a model-free tracking algorithm. Each individual object is tracked by modeling the temporal relationship between sequentially occurring local motion patterns. In this implementation, the algorithm is based on shape and motion descriptors of moving objects, obtained at multiple hierarchical levels from an event understanding or video segmentation system.

In one aspect, there is provided a method of tracking objects in a scene from a sequence of images captured by an imaging device, the method comprising: processing the sequence of images to generate sequential images at a plurality of hierarchical levels to generate a set of regions of interest; at each of the hierarchical levels: examining pairs of sequential images to link pixels into short tracklets; and grouping short tracklets that indicate similar motion patterns to generate representative tracklets; and grouping the representative tracklets to generate a tracking result for at least one object.

In another aspect, there is provided a computer readable storage medium comprising computer executable instructions for of tracking objects in a scene from a sequence of images captured by an imaging device, the computer executable instructions comprising instructions for: processing the sequence of images to generate sequential images at a plurality of hierarchical levels to generate a set of regions of interest; at each of the hierarchical levels: examining pairs of sequential images to link pixels into short tracklets; and grouping short tracklets that indicate similar motion patterns to generate representative tracklets; and grouping the representative tracklets to generate a tracking result for at least one object.

In yet another aspect, there is provided a tracking system comprising a processor and memory, the memory comprising computer executable instructions for causing the processor to track objects in a scene from a sequence of images captured by an imaging device, the computer executable instructions comprising instructions for: processing the sequence of images to generate sequential images at a plurality of hierarchical levels to generate a set of regions of interest; at each of the hierarchical levels: examining pairs of sequential images to link pixels into short tracklets; and grouping short tracklets that indicate similar motion patterns to generate representative tracklets; and grouping the representative tracklets to generate a tracking result for at least one object.

BRIEF DESCRIPTION OF THE DRAWINGS

Embodiments will now be described by way of example only with reference to the appended drawings wherein:

FIG. 3a illustrates a stage in an example of a process for generating hierarchical short tracklets and tracklets;

FIG. 3b illustrates a stage in an example of a process for generating hierarchical short tracklets and tracklets, further to the stage illustrated in FIG. 3a;

FIG. 3c illustrates a stage in an example of a process for generating hierarchical short tracklets and tracklets, further to the stage illustrated in FIG. 3b;

FIG. 3d illustrates a stage in an example of a process for generating hierarchical short tracklets and tracklets, further to the stage illustrated in FIG. 3c;

FIG. 4b illustrates the example of an over-segmented sample video frame of FIG. 4a at a hierarchical level different than the hierarchical level illustrated in FIG. 4a;

FIG. 5a provides a three-dimensional graphical illustration of short tracklet and representative tracklet construction for the video frame depicted in FIGS. 4a to 4c;

FIG. 5b provides a stage further to FIG. 5a in three-dimensional graphical illustration of short tracklet and representative tracklet construction for the video frame depicted in FIGS. 4a to 4c;

DETAILED DESCRIPTION

It has been recognized that by creating long-term trajectories for unknown moving targets using a model-free tracking algorithm, object tracking can be performed without relying on prior knowledge of the targets. As opposed to tracking-by-detection algorithms, no target detection is involved in the base algorithm. However, a target detection system can also be optionally used in conjunction with the model-free tracking algorithm to improve accuracy, as discussed in greater detail below.

Each individual object can be tracked by only modeling the temporal relationship between sequentially occurring local motion/appearance patterns. This is achieved by constructing multiple sets of initial tracks that code local and global motion patterns in videos. These local motion patterns are obtained by analyzing spatially and temporally varying structures in videos, e.g., according to references [8-10].

The system described herein introduces the use of local and global motion descriptors obtained by either a video segmentation or an event detection algorithm [11] for multiple object tracking. The video segmentation assigns a codeword to each pixel from a hierarchical codebook structure obtained at different levels by considering local and global visual context. By examining pairs of sequential video frames, the matching codewords for each video pixel are transitively linked into distinct tracks, whose total number is unknown a priori and which are referred to herein as "short tracklets" or "linklets". The linking process is separately performed at each hierarchical level. This is done under the hard constraint that no two short tracklets may share the same pixel at the same time, i.e. the assigned codewords. The end result at this step is multiple sets of independent short tracklets obtained from the low- to high-level codebooks.

Subsequently, a set of sparse tracks, referred to herein as representative tracklets or simply "tracklets" in the literature, are produced by grouping the short tracklets that indicate similar motion patterns (see also FIGS. 3a to 3d described below). This produces multiple sets of independent representative tracklets. The Markov Chain Monte Carlo Data Association (MCMCDA) is adopted to estimate an initially unspecified number of trajectories. To this end, the tracklet association problem can be formulated as a Maximum A Posteriori (MAP) problem to produce a chain of tracklets. The final output of the data association algorithm is a partition of the set of tracklets such that those belonging to each individual object have been grouped together (see also FIG. 6 described below). It can be appreciated that MCMCDA can be replaced by any other data association system as long as it is within the framework of MAP.

Figure 1:
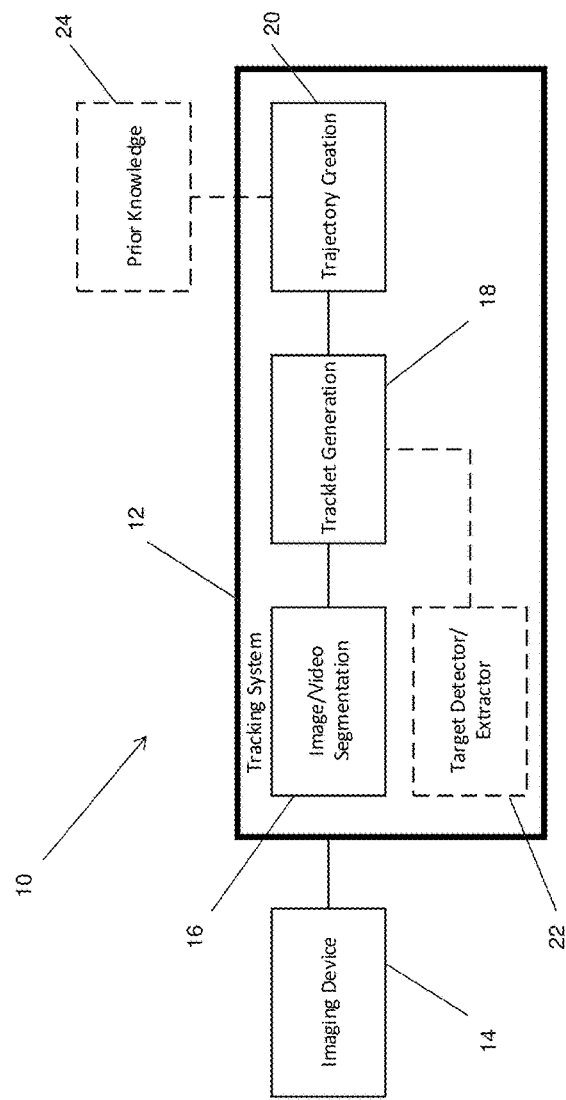
FIG. 1 is an example of a configuration for a system for performing multi-object tracking without using detection responses.

Turning now to the figures, FIG. 1 illustrates an example of a system 10 for multi-target tracking without using detection responses. The system 10 includes a tracking system 12 that receives image and/or video data from an imaging device 14, e.g., for tracking objects in a video. The tracking system 12 includes an image/video segmentation module 16 for segmenting the data received from the imaging device 14, and a tracklet generation module 18 for generating tracklets. It can be appreciated that the image/video segmentation module 16 may instead be any object detection mechanism that processes the images to identify a region in which an object is present and differentiate regions from the rest of the video. In other words, using this module, the sequence of images of the video are processed to generate sequential images at multiple hierarchical levels to generate a set of regions of interest. The tracking system also includes a trajectory creation module 20 for using the tracklets to generate trajectories for the objects being tracked. As noted above, the system 10 may optionally include a target detector/extractor module 22 to augment the data used in tracklet generation, which is used in conjunction with prior knowledge 24 obtained from an external source, which is used to increase the accuracy of the trajectory creation stage.

The prior knowledge 24 can optionally be used in the trajectory construction and data association. The system 10, however, does not require target detection, but the target detector/extractor module 22 can be added to improve the output results.

Figure 2:
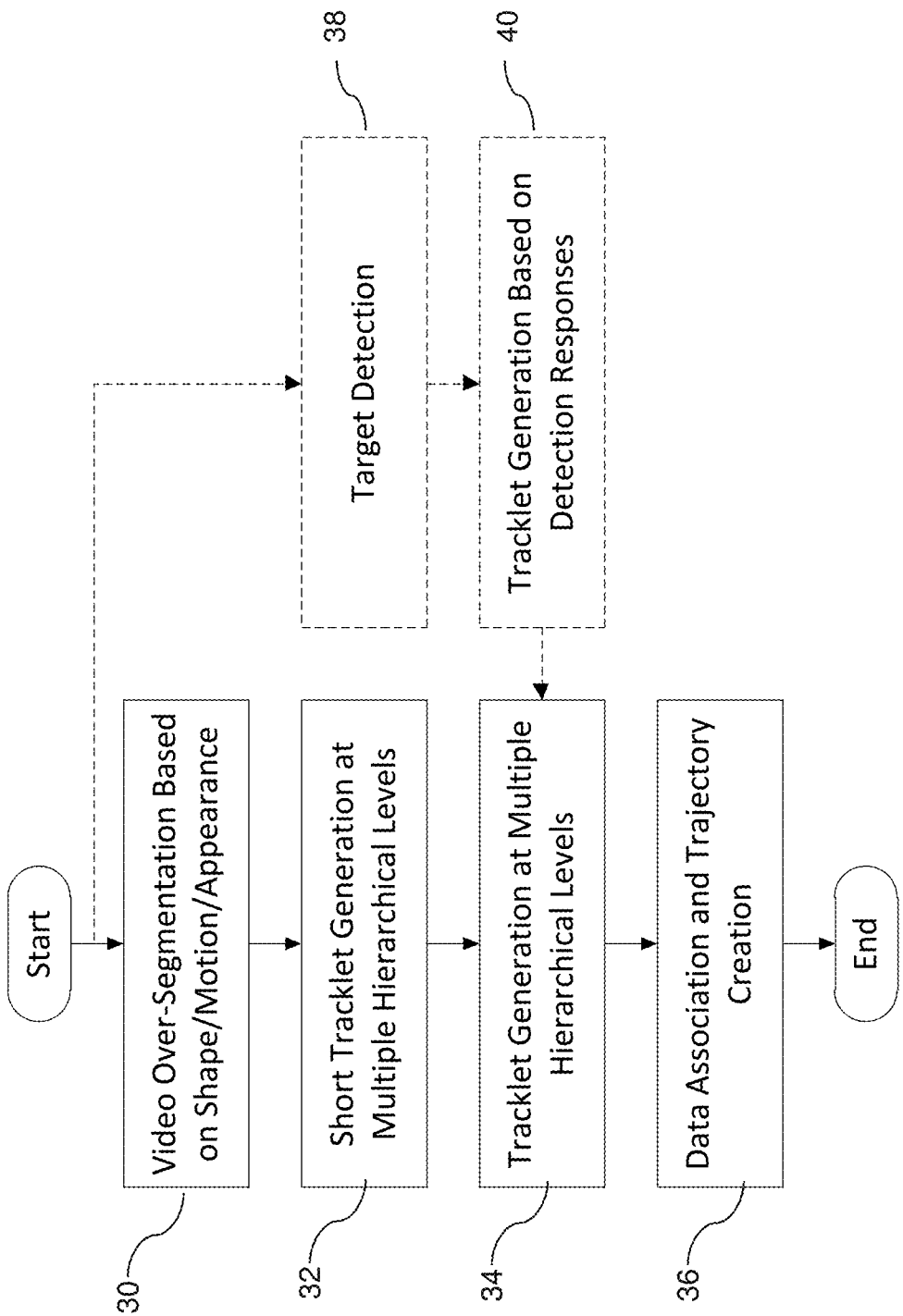
FIG. 2 is a flow chart illustrating a process for multiple-object tracking by hierarchical data association.

FIG. 2 illustrates an example of a process for multiple-target tracking by hierarchical data association. As shown in FIG. 2, the process includes performing a video over-segmentation step 30 based on shape/motion/appearance in the video being analyzed. Short tracklet generation is then performed at step 32 at multiple hierarchical levels as described in greater detail below. The short tracklets are then used at step 34 to generate the representative tracklets at the multiple hierarchical levels. Data association and trajectory creation are then performed at step 36. As illustrated using dashed lines, the system 10 may optionally perform target detection at step 38 (i.e. when a target detector/extractor module 22 and prior knowledge 24 are available), and to assist in tracklet generation based on detection responses at step 40.

FIG. 2 therefore illustrates how the system 10 can operate without target detection, and in presence of a target detection system. If a target detector exists, the generated tracklets from the detection responses are be considered to be the highest level tracklets in the data association step 36.

FIGS. 3a to 3d visually depict an overview of the process shown in FIG. 2. The goal is to estimate the trajectory of the moving objects in the video without invoking object detection. Initially two sets of short tracklets are constructed in the stage illustrated by FIG. 3a by chaining. In this stage, the low-level portion (upper diagram) considers small window fragments, while the high-level portion (lower diagram) analyzes a larger region in order to impose a contextual influence. The results in the stage illustrated by FIG. 3a are obtained by exploiting a system configured for over-segmenting videos. The resultant short tracks (chains) are filtered and replaced in the stage illustrated by FIG. 3b by a set of sparse representative tracks, the so-called representative tracklets. Longer trajectories, i.e. tracking results, are then generated by using the Markov Chain Monte Carlo Data Association (MCMCDA) algorithm in the stage illustrated by FIG. 3c to solve the Maximum A Posteriori (MAP) problem using tracklet affinities. Thus this procedure uses low-level tracklets to connect high-level tracklets when there is a discontinuity in motion or time to produce a final tracking result in the stage illustrated by FIG. 3d.

Figure 4B:
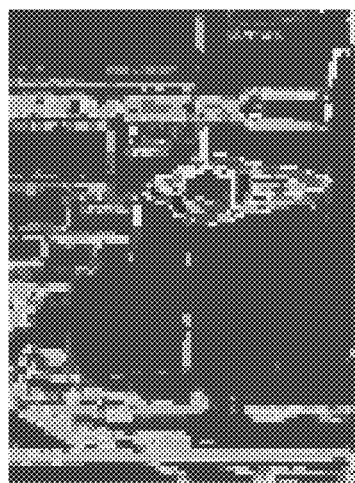
Figure 4A:
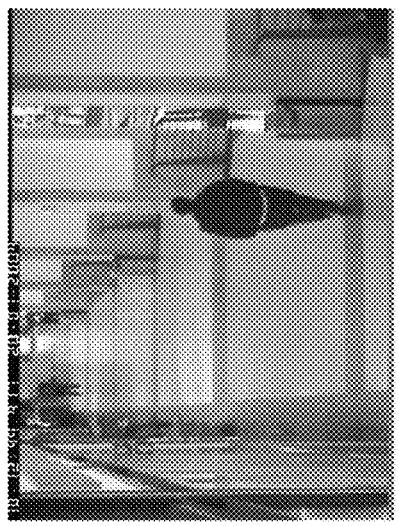
FIG. 4a illustrates an example of an over-segmented sample video frame at a hierarchical level.
Figure 4C:
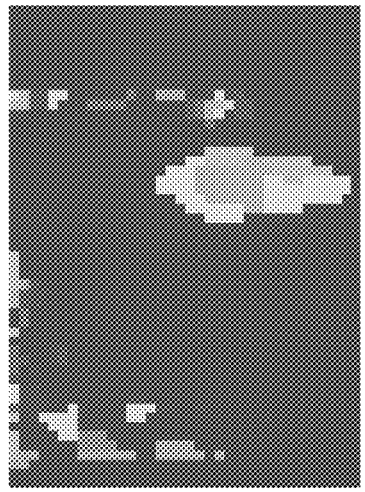
FIG. 4c illustrates the example of an over-segmented sample video frame of FIG. 4a at a hierarchical level different than the hierarchical level illustrated in FIG. 4b.

FIGS. 4a to 4c illustrate a series of the same image from a video to depict codeword assignment for each pixel. In the image illustrated in FIG. 4a, a sample video frame from the CAVIAR dataset [12] is shown. In the image illustrated in FIG. 4b, color-coded low-level codewords are assigned to every pixel in the video frame. In this case, there are a large number of low-level codewords. Finally, in the image illustrated in FIG. 4c, high-level codewords, which represent compositions, are also assigned to every pixel in the video frame. This would generally produce a small number of codewords since it deals with objects in the scene. Each object might be represented by a large number of low-level codewords, while the high-level codebook assigns a few number of codewords to an objects, in most cases one or two.

Figure 5D:
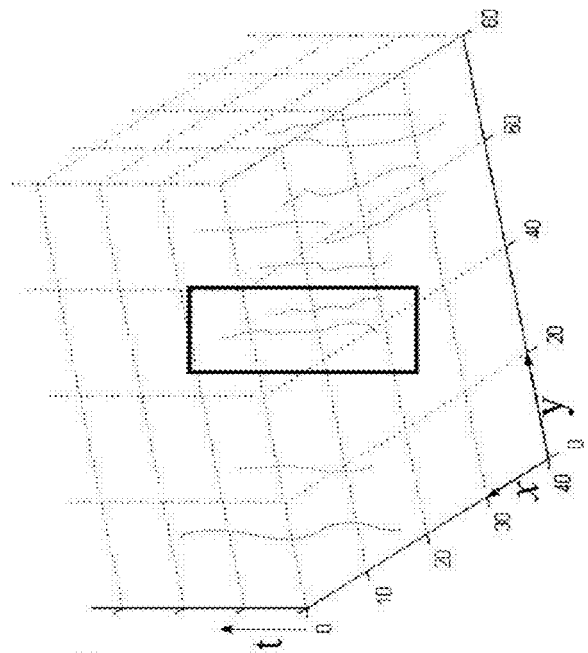
FIG. 5d provides a stage further to FIG. 5b in three-dimensional graphical illustration of short tracklet and representative tracklet construction for the video frame depicted in FIGS. 4a to 4c.
Figure 5C:
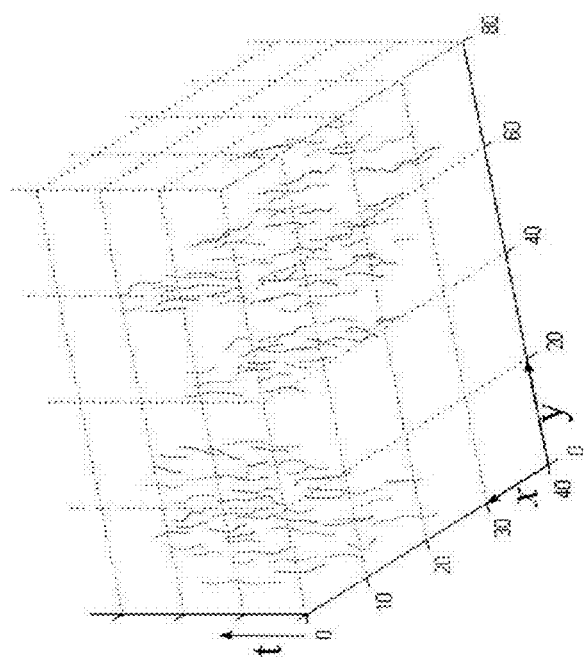
FIG. 5c provides a stage further to FIG. 5b in three-dimensional graphical illustration of short tracklet and representative tracklet construction for the video frame depicted in FIGS. 4a to 4c.

FIGS. 5a to 5d graphically illustrate a process for short tracklet and representative tracklet construction. In the graph illustrated in FIG. 5a, a set of short tracklets (short tracks) is constructed using observations obtained from the low-level codebook, $X^L$. In the graph illustrated in FIG. 5b, a set of short tracklets is constructed using observations obtained from the high-level codebook, $X^H$. Next, in the graph illustrated in FIG. 5c, low-level tracklets, $T^L$, are obtained by grouping similar short tracklets in $X^L$. Finally, the graph illustrated in FIG. 5d illustrates high-level tracklets, $T^H$, obtained by grouping similar short tracklets in $X^H$. The black rectangle shown in FIG. 5d indicates the area in XYT-space occupied by a single person. It can be seen from this, that a single person may produce more than a single trajectory. This is expected since the process illustrated in FIGS. 5a to 5d does not involve any person or object detection, an issue which is also dealt with below, in which a data association process is described that rejects certain tracklets as false positives.

Figure 6:
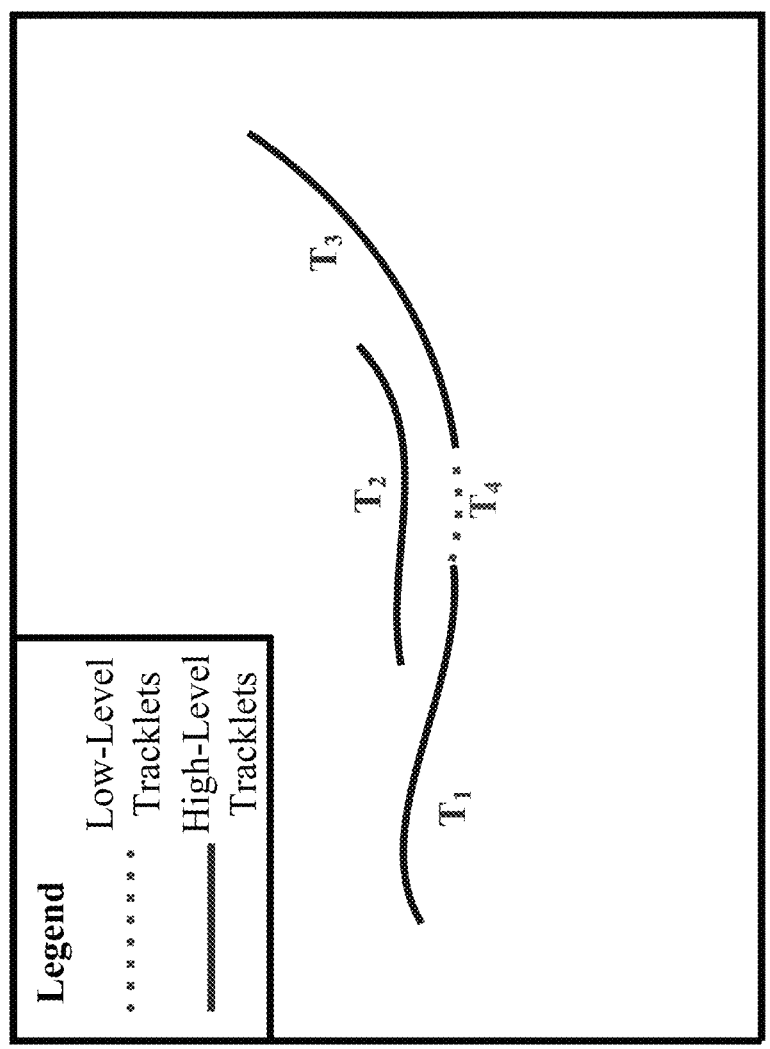
FIG. 6 illustrates graphically a data association and tracklet rejection process.

FIG. 6 illustrates data association and tracklet rejection. It has been found that formulating the MAP estimation as a combination of low and high level tracklets makes it possible to reject some trajectories by considering them as false positives. Here, $T_2$ is a rejected tracklet. A low-level tracklet, $T_4$ is used to connect $T_1$ and $T_3$ based on motion consistency and temporal continuity.

Figure 7A:
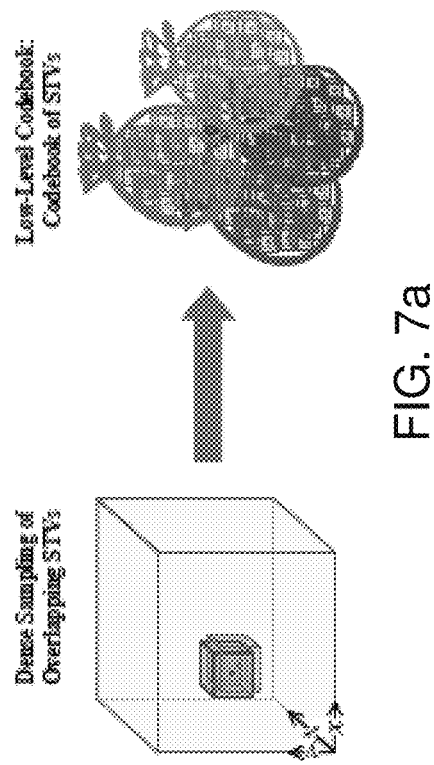
FIG. 7a illustrates low-level codebooks.
Figure 7B:
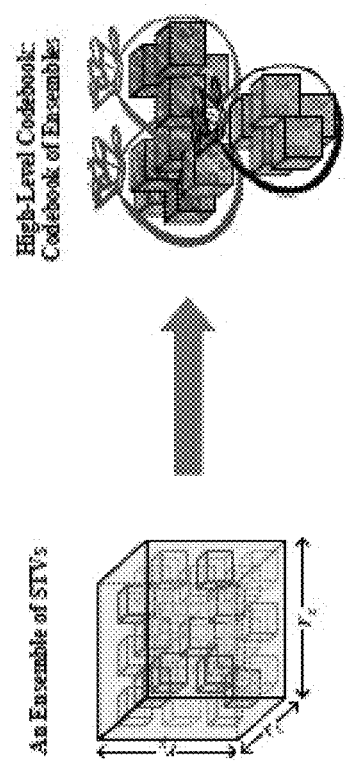
FIG. 7b illustrates high-level codebooks.

FIGS. 7a and 7b illustrate observations represented by low- and high-level codebooks, by way of example only. First, the video is densely sampled to produce a set of overlapping spatio-temporally video volumes (STVs) and, subsequently, a two-level hierarchical codebook is created. It will be appreciated that this example illustrates a two-level hierarchy but may be extended to three or more levels. In the diagram illustrated in FIG. 7a, at the lower level of the hierarchy, similar video volumes are dynamically grouped to form a conventional fixed-size low-level codebook. In the diagram illustrated in 7b, at the higher level, a much larger spatio-temporal 3D volume is created by a large contextual region containing many STVs (in space and time) around each pixel being examined and their compositional relationships being approximated using a probabilistic framework. This volume contains many STVs and captures the spatio-temporal arrangement of the volumes, called an ensemble of volumes. Similar ensembles are grouped based on the similarity between arrangements of their video volumes and yet another codebook is formed. In this example, two codewords are assigned to each pixel, one from the low-level and the other from the high-level codebook. By examining pairs of sequential video frames, the matching codewords for each video pixel are transitively linked into distinct tracks, whose total number is unknown a priori and are referred to herein as linklets. The linking process is separately performed for both codebooks, done under a hard constraint that no two linklets share the same pixel at the same time. The end result is two sets of independent linklets obtained from the low-level and high-level codebooks.

The system 10 described herein is capable of creating an over-segmented representation of video or images based on appearance and/or motion patterns at one or more hierarchical levels [11]. The system 10 uses the information produced to detect and track all moving objects in the scene, and it is also capable of incorporating additional prior knowledge to the tracking system 12, when available.

In general, a video segmentation system is an on-line framework which produces one (or more) sets of codebooks in real-time and assigns labels to local spatio-temporal video volumes or every pixel in each frame based on their similarity, while also considering their spatio-temporal relationships [8].

An example of such system is described in reference [11], in which the low level codebook uses local visual context while the higher level one uses the global visual context and hence, the codebook size is decreased as the process goes up toward the higher levels of the hierarchy.

Considering that there are N levels of hierarchy, $\{I_n\}_{n=1}^N$, and each codebook is referred to as $C^{I_n}$. Depending on the number of codebooks, multiple codewords are assigned to each pixel $p(x, y)$ at time t in the video. Therefore, in a video sequence of temporal length T, a particular pixel $p(x, y)$ is represented by N sequences of assigned codewords (where ← symbolizes value assignment):

$$p(x, y) = \{p(x, y) \leftarrow c_i; \forall t \in T, c_i \in C^{I_n}\} \quad (1)$$

In order to simplify the present discussion and for ease of illustration, the number of hierarchical codebooks is exemplified herein as being equal to two. A sample video frame from a caviar dataset [12] and the assigned codewords are illustrated in FIGS. 4a to 4c. Given the assigned codewords (labels) for each pixel and the over-segmented representation of the video (see again FIGS. 4a to 4c), each segment represents a set of pixels that are similar in terms of local motion patterns or appearance. Therefore, a short trajectory for each pixel is created by examining the temporal coherence of its assigned codewords. Two responses are conservatively associated only if they are in consecutive frames and are close enough in space and similar enough according to their assigned codewords. Depending on the number of codebooks, different sets of trajectories are obtained. Given the current representation of two codebooks, the two sets of trajectories are called $X^{I_n}$, $\{I_n\}_{n=1}^{N=2}$. FIGS. 5a to 5d illustrate the created linklet sets for two hierarchical levels.

It can be observed that the number of linklets is generally more than the number of objects in the scene and that many trajectories may belong to a single object. In addition, it is noted that the number of short tracklets created by a single object is much smaller in $X^{I_n}$ than the ones in $X^{I_{n-1}}$. Ideally one is interested in obtaining a single trajectory for an object. Thus, the short tracklets belonging to the same object should be merged in order to create a single representative track that describes the motion of the object. Here the idea of clustering trajectories is used to create a representative object trajectory, e.g., see references [13, 14].

It can be appreciated that non-informative short tracklets are removed before constructing clusters of trajectories. These are taken to be relatively motionless or those that carry little information about the motion. They are mainly related to the background or static objects. One possibility is to analyze the short tracklets within a temporal window of the length of T. Then, those trajectories with a small variance are removed.

$$X^{I_n} = \{x \in X^{I_n}, \text{var}\{x\} \geq \epsilon^{I_n}\} \quad (2)$$

where $\epsilon^{I_n}$ is a threshold for the short tracklet set $X^{I_n}$. This kind of filtering can be replaced by any other trajectory pruning algorithm and hence, other methods can be used to remove uninformative codewords, such as the one presented in reference [10].

In order to create representative tracklets, similar short tracklets are grouped based on their similarity and proximity in space and time. One possibility is to adopt the pairwise affinities between all trajectories as a similarity measurement, e.g., see reference [14].

The distance between two trajectories x and y, D(x, y), is defined as:

$D^2(x,y) = \max_t \{d_t^2(x, y)\}$, where $d_t^2(x, y)$ is the distance between two trajectories x and y at the time t and defined as follows:

$$d^2(x, y) = \|(x - y)\|^2 \frac{\|\nabla_t(x - y)\|^2}{5\sigma_t^2} \quad (3)$$

The first factor on the right-hand-side of equation (3) is the average spatial Euclidean distance between the two trajectories. The second factor characterizes the motion of a point aggregated over a number of frames at time t. The normalization term, $\sigma_t$, accounts for the local variation in the motion, e.g., see reference [14]. Given the above distance measurement between two trajectories, clustering can be performed using the k-means algorithm. Here iterative clustering is invoked to determine the optimal number of clusters. In order to perform the merging, the Jensen-Shannon divergence measure can be used to compute the actual difference between the resulting clusters. It should be noted that the tracking system 12 is independent of the choice of the clustering algorithm and similarity measurement method between trajectories. Accordingly, the example algorithms described herein are for illustrative purposes and similarly operable algorithms could instead be used.

Eventually, clustering produces N sets of tracklets, which are referred to as $T^{I_n}$.

The tracklets obtained after clustering are not quite reliable for long term object tracking, but do a relatively good job of encoding the moving object motions in the short term (see FIGS. 5a to 5d). The main advantage of constructing the tracklets based on the hierarchical codebooks is that no target detection is required. Although a set of representative trajectories is created for all moving objects in the video, there is no guarantee that an object would be represented by a single trajectory. Moreover, in crowded scenes, the representative trajectories may correspond to more than one object. However, if the motion pattern changes, then the trajectories would separate.

Given the resulting tracklets, high-level trajectories can be generated by linking them in space and time. This can be achieved by formulating the data association as a maximum a posteriori (MAP) problem and solve it with the Markov Chain Monte Carlo Data Association (MCMCDA) algorithm.

The observations are taken to be the constructed tracklets, $O = \{T^{I_n}\}_{n=1}^N$. Let $\Gamma$ be a tracklet association result, which is a set of trajectories, $\Gamma_k \in \Gamma$. $\Gamma_k$ is defined as a set of the connected observations which is a subset of all observations, $$\Gamma_k = \{T_{i_1}^{I_1}, T_{i_2}^{I_2}, \ldots, T_{i_N}^{I_N}\} \subseteq O.$$

The goal is to find the most probable set of object trajectories, $\Gamma$, which is formulated as a MAP problem:

$$\Gamma^* = \arg\max_\Gamma P(\Gamma \mid O) = \arg\max_\Gamma P(O \mid \Gamma) P(\Gamma) \quad (4)$$

The likelihood, $P(O|\Gamma)$ indicates how well a set of trajectories matches the observations and the prior, $P(\Gamma)$ indicates how correct is the data association.

By assuming that the likelihoods of the tracklets are conditionally independent, we can rewrite the likelihood, $P(O|\Gamma)$, in equation (4) as follows:

$$P(O \mid \Gamma) = \prod_{T_{i_n}^{I_n} \in T^{I_n}} P(T_{i_1}^{I_1}, T_{i_2}^{I_2}, \ldots, T_{i_N}^{I_N} \mid \Gamma) \prod_{\Gamma_k \in \Gamma} P(\Gamma_k) \quad (5)$$

First one can consider the encoding of the likelihood of tracklets in (5). The observations, that is, the tracklets, can be either true or false trajectories of the object. Therefore, the likelihood of a tracklet, given the set of trajectories, S, can be modeled by a Bernoulli distribution:

$$P(T \mid \Gamma) \sim \text{Bern}(p) = \begin{cases} p^{|T|}: T \in \Gamma_k, \Gamma_k \in \Gamma \\ (1-p)^{|T|}: T \notin \Gamma_k, \Gamma_k \in \Gamma \end{cases} \quad (6)$$

where |T| denotes how good is a tracklet. Since the tracklets are taken to be clusters of small trajectories constructed previous, |T| is defined as the size of the cluster. It is assumed that the N sets of tracklets, $\{T^{I_n}\}_{n=1}^{N}$, are independent (the independency assumption is valid here because the consistency between tracklets and observations, i.e., the suitability of the tracklets, is independent of the relationship between trajectories). Therefore, the likelihood in equation (5) can be written as follows:

$$P(T_{i,1}^{I_1}, T_{i,2}^{I_2}, \ldots, T_{i,N}^{I_N} | \Gamma) \prod_{n=1}^{N} P(T_{i,n}^{I_n} | \Gamma) \qquad (7)$$

where, $$P(T_{i,n}^{I_n} | \Gamma) \sim Bern(p^{I_n})$$

as described in equation (6). This formulation makes it possible to exclude some tracklets from the final data association by assuming that any tracklet can belong to at most one trajectory in the data association process. This is achieved simply by rejecting them as false object tracklets.

Next one can consider the encoding of the prior of tracklets in equation (5), $P(\Gamma_k)$. These priors can be modeled as a Markov chain:

$$P(\Gamma_k) = \prod_{\Gamma_k^t \in \Gamma_k} P(\Gamma_k^t | \Gamma_k^{t-1}) = P_i(\Gamma_k^0) P_l(\Gamma_k^1 | \Gamma_k^0) \ldots P_l(\Gamma_k^n | \Gamma_k^{n-1}) P_t(\Gamma_k^n) \qquad (8)$$

where $\Gamma_k^t$ is the trajectory of the object at a time instant t. The chain includes an initialization term, $P_i$, a probability to link the tracklets, $P_l$, and a termination probability, $P_t$, to terminate the trajectory.

It is assumed in this example that a trajectory can only be initialized or terminated using the tracklets obtained from the highest level codebook, $T^{I_N}$. Therefore, the probabilities of initializing and terminating a trajectory are written as follows:

$$P_i(\Gamma_k^0) = P_i(T_j^{I_N}) \qquad (9)$$

$$P_t(\Gamma_k^n) = P_t(T_j^{I_N}) \qquad (10)$$

Any prior information such as entry and exit zones can be incorporated into the trajectory initialization and termination probabilities. The probability of linking two tracklets can be written as:

$$P_l(\Gamma_k^t | \Gamma_k^{t-1}) = P_l\left(T_{j_t^N}^{I_N}, \ldots, T_{j_t^2}^{I_2}, T_{j_t^1}^{I_1} | T_{j_{t-1}^N}^{I_N}, \ldots, T_{j_{t-1}^2}^{I_2}, T_{j_{t-1}^1}^{I_1}\right) \qquad (11)$$

$$= P_l\left(T_{j_t^N}^{I_N}, \ldots, T_{j_t^2}^{I_2} | T_{j_t^1}^{I_1}, T_{j_{t-1}^N}^{I_N}, \ldots, T_{j_{t-1}^2}^{I_2}, T_{j_{t-1}^1}^{I_1}\right)$$

$$P_l\left(T_{j_t^1}^{I_1} | T_{j_{t-1}^N}^{I_N}, \ldots, T_{j_{t-1}^2}^{I_2}, T_{j_{t-1}^1}^{I_1}\right)$$

$$= P_l\left(T_{j_t^N}^{I_N} | T_{j_t^{N-1}}^{I_{N-1}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right)$$

$$P_l\left(T_{j_t^{N-1}}^{I_{N-1}} | T_{j_t^{N-2}}^{I_{N-2}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right) \ldots$$

$$P_l\left(T_{j_t^1}^{I_1} | T_{j_{t-1}^N}^{I_N}, \ldots, T_{j_{t-1}^2}^{I_2}, T_{j_{t-1}^1}^{I_1}\right)$$

Two tracklets are linked if they are consistent in the time domain and show similar motion patterns. One can assume independency and decompose the probability of linking the tracklets into two probabilities. Therefore equation (11) is rewritten as:

$$P_l(\Gamma_k^t | \Gamma_k^{t-1}) = \qquad (12)$$

$$P_T\left(T_{j_t^N}^{I_N} | T_{j_t^{N-1}}^{I_{N-1}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right)$$

$$P_M\left(T_{j_t^N}^{I_N} | T_{j_t^{N-1}}^{I_{N-1}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right)$$

$$P_T\left(T_{j_t^{N-1}}^{I_{N-1}} | T_{j_t^{N-2}}^{I_{N-2}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right)$$

$$P_M\left(T_{j_t^{N-1}}^{I_{N-1}} | T_{j_t^{N-2}}^{I_{N-2}}, \ldots, T_{j_t^2}^{I_2}, T_{j_t^1}^{I_1}, T_{j_{t-1}^N}^{I_N}, \ldots, T_{j_{t-1}^2}^{I_2}, T_{j_{t-1}^1}^{I_1}\right) \ldots$$

$$P_T\left(T_{j_t^1}^{I_1} | T_{j_{t-1}^N}^{I_N}, \ldots, T_{j_{t-1}^2}^{I_2}, T_{j_{t-1}^1}^{I_1}\right) P_M\left(T_{j_t^1}^{I_1} | T_{j_{t-1}^N}^{I_N}, \ldots, T_{j_{t-1}^2}^{I_2}, T_{j_{t-1}^1}^{I_1}\right)$$

where the temporal consistency probability, $P_T$, is taken to be the hyper-exponential distribution of the temporal gap between the tracklets:

$$P_T\left(T_{j_t^1}^{I_1} | T_{j_{t-1}^N}^{I_N}, \ldots, T_{j_{t-1}^2}^{I_2}, T_{j_{t-1}^1}^{I_1}\right) = \sum_n \alpha_n P_n(\tau_n) \qquad (13)$$

$$P_n(\tau_n) \sim Exp(\lambda_n) = \begin{cases} \lambda_n e^{(\lambda_n \tau_n)} : & \tau_n \geq 00 \\ 0 : & \tau_n < 0 \end{cases} \qquad (14)$$

where $\tau_n$ is the temporal distance between the end of a tracklet and the start of its immediate successor. The motion consistency probability, $P_M$, is modeled by assuming that the trajectories follow a constant velocity model and obey a Gaussian distribution.

The combinatorial solution space of $\Gamma$ in equation (4) is extremely large and finding good tracklet associations can be extremely challenging. Here the MCMCDA sampling approach is followed, to simultaneously estimate the parameters and $\Gamma^*$.

FIG. 6 shows how the two low- and high-level tracklets can be used for constructing long trajectories in a data association framework. Formulating the likelihood as described in equation (7) makes it possible to reject some trajectories by considering them as false positives. Here, $T_2$ is a rejected tracklet. A lower level tracklet, $T_4$ is used to connect $T_1$ and $T_3$ based on motion consistency and temporal continuity.

MCMC is a general method for generating samples from a distribution, p, by constructing a Markov chain in which the states are $\Gamma$. At any state $\Gamma$, a new proposal is introduced using the distribution, $q(\Gamma|\Gamma')$. One can consider three types of association as a result of the sampling process.

The first randomly selects one tracklet and one trajectory. This affects the current state of the tracklet by associating it to the selected trajectory.

The second, called swapping, postulates that, all tracklets constructing the two trajectories be swapped at a randomly chosen time.

Finally, the third proposes a change of trajectory type. One can decide which of the three $\Gamma'$ should be accepted by employing the Metropolis-Hastings acceptance function, e.g., see reference [15], which defines the likelihood by:

$$A(\Gamma, \Gamma') = \min\left\{\frac{p(\Gamma')q(\Gamma \mid \Gamma')}{p(\Gamma)q(\Gamma' \mid \Gamma)}, 1\right\} \quad (15)$$

In addition, in order to estimate the model parameters, we use MCMCDA sampling followed by an additional Metropolis-Hastings update for the parameters.

By employing two codebooks for video segmentations, the algorithm has been tested using the TUD [16] and CAVIAR [12] datasets. All parameters have been set experimentally, but most have remained identical for all sequences. In all cases, the suggested parameters in reference [10] have been used for codebook construction. Quantitative comparisons with state-of-art methods have also been performed, as well as visual results of the approach described herein.

One can follow the same evaluation metrics as those in references [7, 17-19]. These are Mostly Tracked (MT), which is the percentage of the trajectories covered by the tracker output more than 80% of the time; Mostly Lost (ML) which is the percentage of the trajectories covered by the tracker output less than 20% of the time; ID Switch (ID) which is the number of times that a trajectory changes its matched ground truth identity; fragments (FRAG), which is the number of times that a ground truth trajectory is interrupted (i.e., each time it is lost by the current hypothesis); and average False Alarms per Frame (FAF). The current system without employing object detection achieved the following results, for a representative two-level example:

| Dataset | MT | ML | ID | FRAG | FAF |
| --- | --- | --- | --- | --- | --- |
| CAVIAR | 84.3 | 6.4 | 18 | 16 | 0.237 |
| TUD | 60 | 10 | 1 | 4 | 0.281 |

The results indicate that although the correct detections obtained with the present algorithm may be comparable to other approaches, they include more false positives. This can be expected, at least in some cases, since no object detection is employed. As noted above, the scene observations that are used are motion descriptors and do not incorporate object appearance, as do object-centric trackers.

Accordingly, there is provided a method for tracking objects in a scene from a sequence of images which are captured by an imaging device such as a camera. The method is based upon a process comprising the steps of: receiving a plurality of over-segmented regions on one image or a plurality of images, generating a hierarchical representation of the targets' trajectories in terms of local and global motion patterns, and generating a probabilistic framework to encode hierarchical trajectory creation.

The method can also include generating at least one set of short trajectories over time for every region (or pixel) in the videos based on local and global motion patterns, referred to herein as short tracklets or linklets. Also, representative trajectories for regions with coherent motion patterns can be generated, referred to herein as representative tracklets or simply tracklets.

The method and system described herein can be used for generating long term trajectories for each target by linking tracklets over time, and a hierarchical representation of short tracklets of all moving objects can also be generated.

The method can also incorporate a hierarchical data association mechanism for formulating the data association problem as a MAP estimation, connecting tracklets and generating long term trajectories of every target, filling gaps between disconnected trajectories, and removing irrelevant trajectories in a probabilistic fashion by considering them as false trajectories.

The method can also incorporate a target detection system in the hierarchical trajectory creation.

The method can also include the use of low-level tracklets as supportive information for filling the gaps between high-level tracklets, to produce smooth trajectories.

The method can also incorporate prior knowledge to increase accuracy, such as the number of targets to be tracked, regions of interest for the targets, camera parameters, and/or calibration data, ground plane location, entry/exit zones of the targets in the scene appearance and/or shape representation of the targets.

The system performing the above described method does not require any prior information about the objects or the scene. In another words, object detection is not required.

The system can be operable to work with motion patterns of all objects in the scene and in its basic form it does not require any appearance or shape representation of the targets.

A method for multi-object tracking in videos is also provided, which exploits an event descriptor obtained from an event description system. A method for multi-object tracking in videos exploiting local and global motion patterns of every pixel in the video is also provided.

LIST OF REFERENCES BEING INCORPORATED HEREIN BY REFERENCE

1. Kratz, L. and K. Nishino, *Tracking Pedestrians Using Local Spatio-Temporal Motion Patterns in Extremely Crowded Scenes*. Pattern Analysis and Machine Intelligence, IEEE Transactions on, 2012. 34(5): p. 987-1002.

2. Javan Roshtkhari, M. a. L., Martin. *Multiple Object Tracking Using Local Motion Patterns*. in Proceedings of the British Machine Vision Conference. 2014. BMVA Press.

3. Roshan Zamir, A., A. Dehghan, and M. Shah, *GMCP-Tracker: Global Multi-object Tracking Using Generalized Minimum Clique Graphs*, in Computer Vision-ECCV 2012. 2012, Springer Berlin Heidelberg. p. 343-356.

4. Lu, Z. and L. van der Maaten, *Structure Preserving Object Tracking*, in Computer Vision and Pattern Recognition (CVPR), 2013 IEEE Conference on. 2013. p. 1838-1845.

5. Jingchen, L., et al., *Tracking Sports Players with Context-Conditioned Motion Models*, in Computer Vision and Pattern Recognition (CVPR), 2013 IEEE Conference on. 2013. p. 1830-1837.

6. Chang, H., L. Yuan, and R. Nevatia, *Multiple Target Tracking by Learning-Based Hierarchical Association of Detection Responses*. Pattern Analysis and Machine Intelligence, IEEE Transactions on, 2013. 35(4): p. 898-910.

7. Yang, B. and R. Nevatia, *Multi-Target Tracking by Online Learning a CRF Model of Appearance and Motion Patterns*. International Journal of Computer Vision, 2014. 107(2): p. 203-217.

8. Roshtkhari, M. J. and M. D. Levine, *Online Dominant and Anomalous Behavior Detection in Videos*, in Computer Vision and Pattern Recognition (CVPR), 2013 IEEE Conference on. 2013. p. 2609-2616.

9. Roshtkhari, M. J. and M. D. Levine, *An on-line, real-time learning method for detecting anomalies in videos using spatio-temporal compositions, Computer Vision and Image Understanding*. Computer Vision and Image Understanding, 2013. 117(10): p. 1436-1452.

10. Roshtkhari, M. J. and M. D. Levine, *Human activity recognition in videos using a single example*. Image and Vision Computing, 2013. 31(11): p. 864-876.

11. Roshtkhari, M. J. and M. D. Levine, *METHODS AND SYSTEMS RELATING TO ACTIVITY ANALYSIS*. 2014.

12. *CAVIAR Dataset*. http://homepages.inf.ed.ac.uk/rbf/CAVIARDATA1.

13. Shandong, W., B. E. Moore, and M. Shah, *Chaotic invariants of Lagrangian particle trajectories for anomaly detection in crowded scenes, in Computer Vision and Pattern Recognition (CVPR)*, 2010 IEEE Conference on. 2010. p. 2054-2060.

14. Brox, T. and J. Malik, *Object Segmentation by Long Term Analysis of Point Trajectories, in Computer Vision-ECCV 2010*. 2010, Springer Berlin Heidelberg. p. 282-295.

15. Gilks, W. R., S. Richardson, and D. J. Spiegelhalter, *Markov chain Monte Carlo in practice*. 1998: Chapman & Hall.

16. Andriyenko, A. and K. Schindler, *Multi-target tracking by continuous energy minimization, in Computer Vision and Pattern Recognition (CVPR)*, 2011 IEEE Conference on. 2011. p. 1265-1272.

17. Song, B., et al., *A stochastic graph evolution framework for robust multi-target tracking, in Computer Vision-ECCV 2010*. 2010, Springer-Verlag. p. 605-619.

18. Li, Z., L. Yuan, and R. Nevatia, *Global data association for multi-object tracking using network flows, in Computer Vision and Pattern Recognition (CVPR)*, 2008 IEEE Conference on. 2008. p. 1-8.

19. Yuan, L., H. Chang, and R. Nevatia, Learning to associate: *HybridBoosted multi-target tracker for crowded scene, in Computer Vision and Pattern Recognition (CVPR)*, 2009 IEEE Conference on. 2009. p. 2953-2960.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of tracking objects in a scene from a sequence of images captured by an imaging device, the method comprising:
   processing the sequence of images to generate sequential images at a plurality of hierarchical levels to generate a set of regions of interest;
   at each of the hierarchical levels:
      examining pairs of sequential images to transitively link pixels in the images into short tracklets, wherein a plurality of independent short tracklets can be associated with a same object and wherein a total number of short tracklets can be unknown a priori; and
      grouping short tracklets that indicate similar motion patterns and proximity in both space and time, to generate representative tracklets; and
   grouping the representative tracklets to generate a tracking result for at least one object.

2. The method of claim 1, wherein the sequence of images are segmented at the plurality of hierarchical levels according to local and global shapes and motion patterns.

3. The method of claim 1, wherein the processing comprises assigning a codeword to each pixel in each of the sequence of images using a codebook for each of the hierarchical levels.

4. The method of claim 3, wherein a low level codebook uses local visual context and a higher level codebook uses a global visual content.

5. The method of claim 1, further comprising rejecting at least one representative tracklet as a false positive.

6. The method of claim 1, wherein a pair of high level representative tracklets having a discontinuity are linked using a low level representative tracklet.

7. The method of claim 1, wherein grouping the representative tracklets comprises using a maximum a posteriori (MAP) estimation for performing data association.

8. The method of claim 1, further comprising performing target detection using prior knowledge, and using detection responses in generating the representative tracklets.

9. The method of claim 8, wherein the prior knowledge comprises any one or more of: a number of targets to be tracked, one or more regions of interest for the targets, at least one parameter of the imaging device, calibration data for the imaging device, ground plane location, entry or exit zones of the targets, and appearance or shape representation of the targets.

10. A non-transitory computer readable storage medium comprising computer executable instructions for of tracking objects in a scene from a sequence of images captured by an imaging device, the computer executable instructions comprising instructions for:

processing the sequence of images to generate sequential images at a plurality of hierarchical levels to generate a set of regions of interest;

at each of the hierarchical levels:

examining pairs of sequential images to transitively link pixels in the images into short tracklets, wherein a plurality of independent short tracklets can be associated with a same object and wherein a total number of short tracklets can be unknown a priori; and grouping short tracklets that indicate similar motion patterns and proximity in both space and time, to generate representative tracklets; and grouping the representative tracklets to generate a tracking result for at least one object.

11. The non-transitory computer readable storage medium of claim 10, wherein the sequence of images are segmented at the plurality of hierarchical levels according to local and global shapes and motion patterns.

12. The non-transitory computer readable storage medium of claim 10, wherein the processing comprises assigning a codeword to each pixel in each of the sequence of images using a codebook for each of the hierarchical levels.

13. The non-transitory computer readable storage medium of claim 12, wherein a low level codebook uses local visual context and a higher level codebook uses a global visual content.

14. The non-transitory computer readable storage medium of claim 10, further comprising rejecting at least one representative tracklet as a false positive.

15. The non-transitory computer readable storage medium of claim 10, wherein a pair of high level representative tracklets having a discontinuity are linked using a low level representative tracklet.

16. The non-transitory computer readable storage medium of claim 10, wherein grouping the representative tracklets comprises using a maximum a posteriori (MAP) estimation for performing data association.

17. The non-transitory computer readable storage medium of claim 10, further comprising performing target detection using prior knowledge, and using detection responses in generating the representative tracklets.

18. The non-transitory computer readable storage medium of claim 17, wherein the prior knowledge comprises any one or more of: a number of targets to be tracked, one or more regions of interest for the targets, at least one parameter of the imaging device, calibration data for the imaging device, ground plane location, entry or exit zones of the targets, and appearance or shape representation of the targets.

19. A tracking system comprising a processor and memory, the memory comprising computer executable instructions for causing the processor to track objects in a scene from a sequence of images captured by an imaging device, the computer executable instructions comprising instructions for:

processing the sequence of images to generate sequential images at a plurality of hierarchical levels to generate a set of regions of interest;

at each of the hierarchical levels:

examining pairs of sequential images to transitively link pixels in the images into short tracklets, wherein a plurality of independent short tracklets can be associated with a same object and wherein a total number of short tracklets can be unknown a priori; and grouping short tracklets that indicate similar motion patterns and proximity in both space and time, to generate representative tracklets; and grouping the representative tracklets to generate a tracking result for at least one object.

\* \* \* \* \*

UNITED STATES PATENT AND TRADEMARK OFFICE
CERTIFICATE OF CORRECTION

Page 1 of 1

PATENT NO. : 9,824,281 B2
APPLICATION NO. : 14/713452
DATED : November 21, 2017
INVENTOR(S) : Mehrsan Javan Roshtkhari and Martin D. Levine It is certified that error appears in the above-identified patent and that said Letters Patent is hereby corrected as shown below:

On the Title Page

After "Inventors:", delete "Roshtkhari Javan" in the first inventor's name and substitute therefor
--- Javan Roshtkhari ---

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*